United States Patent
Brabson et al.

(10) Patent No.: US 7,096,281 B2
(45) Date of Patent: Aug. 22, 2006

(54) EFFICIENT CONNECTIVITY BETWEEN MULTIPLE TOPOLOGY SUBNETS VIA COMMON CONNECTION NETWORK

(75) Inventors: Roy F. Brabson, Raleigh, NC (US); Patrick G. Brown, Hillsborough, NC (US); Ralph B. Case, Raleigh, NC (US); Wesley McMillan Devine, Apex, NC (US); Johnathan Louis Harter, Raleigh, NC (US); Samuel E. Reynolds, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 800 days.

(21) Appl. No.: 09/930,360

(22) Filed: Aug. 15, 2001

(65) Prior Publication Data

US 2003/0037168 A1 Feb. 20, 2003

(51) Int. Cl.
*G06F 15/16* (2006.01)
(52) U.S. Cl. .................. 709/249; 709/230; 709/220
(58) Field of Classification Search ............... 709/249, 709/220, 230
See application file for complete search history.

(56) References Cited

U.S. PATENT DOCUMENTS

| | | | | |
|---|---|---|---|---|
| 6,026,077 | A * | 2/2000 | Iwata | 370/254 |
| 6,069,889 | A * | 5/2000 | Feldman et al. | 370/351 |
| 6,167,445 | A * | 12/2000 | Gai et al. | 709/223 |
| 6,205,488 | B1 * | 3/2001 | Casey et al. | 709/238 |
| 6,529,499 | B1 * | 3/2003 | Doshi et al. | 370/352 |
| 6,628,610 | B1 * | 9/2003 | Waclawsky et al. | 370/229 |
| 6,674,760 | B1 * | 1/2004 | Walrand et al. | 370/411 |
| 6,751,220 | B1 * | 6/2004 | Li | 370/390 |
| 6,765,864 | B1 * | 7/2004 | Natarajan et al. | 370/224 |
| 6,775,280 | B1 * | 8/2004 | Ma et al. | 370/392 |
| 2001/0044842 | A1 * | 11/2001 | Kawakami | 709/223 |

OTHER PUBLICATIONS

Loring Wirbel, "Cisco, FVC.COM roll packet video offerings," Apr. 14, 2000, EETimes, http://www.eet.com/articles/showArticle.jhtml?articleID= 18303915.*
3 com, "OSPF and Policy-Based Routing," 2000, 3 Com Corporation, http://totalservice.utstar.com/TCSDOCS/4.2/10040536/harc—osp.htm.*
E. Rosen, "BGP/MP:S VPNs," Mar. 1999, Cisco System, inc., http://www.faqs.org/rfcs/frc2547.html.*

* cited by examiner

*Primary Examiner*—Saleh Najjar
*Assistant Examiner*—Nghi V. Tran
(74) *Attorney, Agent, or Firm*—Myers Bigel Sibley & Sajovec, PA

(57) ABSTRACT

An improved technique is disclosed for routing data across multiple topology subnets, and for improving the connectivity between nodes in multiple topology subnets, by using a common connection network. A new type of virtual node, referred to herein as a "global" virtual routing node or "GVRN", is defined to represent connectivity to an underlying network that may extend beyond the boundaries of the topology subnets in the end-to-end path. This underlying network is also referred to as a "common connection network" or a "global connection network". The present invention also defines novel techniques with which border nodes pass routing information between networks to convey connectivity to the GVRN. In many cases, use of GVRNs will result in shorter end-to-end data transmission paths.

6 Claims, 7 Drawing Sheets

EFFICIENT CONNECTIVITY BETWEEN MULTIPLE TOPOLOGY SUBNETS VIA COMMON CONNECTION NETWORK

BACKGROUND OF THE INVENTION

1. Field of the Invention

The present invention relates to computer networks, and deals more particularly with methods, systems, and computer program products for improving the connectivity between nodes in multiple topology subnets by using a common connection network (such as the public Internet).

2. Description of the Related Art

For purposes of the following descriptions, a computer data network (or, equivalently, a computer communications network) can be defined generally as a collection of nodes and the communications links which connect various ones of the nodes to each other. Nodes may be general purpose computers or special purpose computers such as routers. Nodes may also be terminal devices such as printers or display devices. Links are generally connected to nodes on either end by "adapters". For example, a node may connect to a token ring local area network ("LAN") using a token ring adapter, and/or may connect to an Ethernet LAN using an Ethernet adapter. Collectively, the nodes and links between them are referred to as network resources. The physical configuration and characteristics of the various nodes and links in a network are said to be the topology of the network.

To transmit data from one node to another node, a path or route must be set up through the network. The route will include the originating node, the destination node, possibly one or more intermediate nodes, and the links or transmission groups which connect the nodes on the route. A transmission group or "TG", as the term is used herein, refers to a set of parallel links with similar characteristics, which may be combined as a single logical link with a higher aggregated capacity. (A transmission group may alternatively comprise only a single link. The terms "link" and "transmission group" are used interchangeably hereinafter.) Links between nodes may use any one of a number of types of transmission media, and may be permanent in nature (such as conventional cable connections) or may be enabled only when needed (such as dial-up telephone connections).

Those nodes which are capable of performing functions within the network, including routing of messages between the node itself and its adjacent or neighboring nodes, selection of routes for messages to be transmitted between two nodes, and the furnishing of directory services for other nodes, are referred to herein as "network nodes". Nodes which do not provide these types of functions are referred to herein as "end nodes". End nodes may host application programs, but require the services of network nodes to locate partner programs in the network and set up communications. Border nodes which combine the function of a network node and an end node were disclosed in commonly-assigned U.S. Pat. No. 5,241,682, which is entitled "Border Node having Routing and Functional Capability in a First Network and Only Local Address Capability in a Second Network" (hereinafter referred to as "the border node patent"), which is hereby incorporated herein by reference as if set forth fully. Border nodes enable communication between two (or more) networks, and have a network node interface for outbound communications from the native (e.g. originating node's) network and an end node interface for inbound communications from the non-native (e.g. destination node's) network.

To transmit data effectively through a network, the nodes cooperate with each other on the implementation of various distributed communication protocols. Some of the more important protocols are a location protocol, which is used to find the destination node which implements a desired application program, and a routing protocol, which is used to select an appropriate route or path through the network on which to transmit the data. Typically, the selected route is optimized in some sense. While there are many techniques for route optimization, most involve minimizing the number of nodes and links in the path. One example is the "Open Shortest Path First", or "OSPF", routing protocol. OSPF is defined in Request For Comments ("RFC") 2178, "OSPF Version 2" (July 1997), from the Internet Engineering Task Force ("IETF"). Another routing protocol is the Routing Information Protocol, or "RIP", which is defined in RFC 1723, "RIP Version 2" (November 1994). OSPF and RIP are commonly used for routing in Transmission Control Protocol/Internet Protocol ("TCP/IP") networks, and are well known in the art.

Layered network architectures are common. One example is the Systems Network Architecture ("SNA") which was defined by the International Business Machines Corporation ("IBM"). Another example is the Open Systems Interconnection ("OSI") reference model, which is defined in International Standard ISO/IEC 7498-1 (1994), "Open Systems Interconnection—Basic Reference Model". These layered network architectures are comprised of a physical layer at the lowest layer, where the actual data transmission over physical media occurs, and a highest layer where transmitted and received data is abstracted for use by an application program. Different layered architectures use different numbers of intermediate layers and different functional divisions for those layers, but in general include a lower layer commonly referred to as the "network layer" in which routing functions reside. A connection through a network may pass through intermediate network nodes, such as routers, whose highest implemented layer is often the network layer.

IBM's Advanced Peer-to-Peer Network ("APPN") is an example of a layered computer network architecture in which the nodes of the network are peers. That is, each node is considered to be an equal to all other nodes from a control perspective.

In many cases, the links between nodes in a network are actually logical connections provided by an "underlying network". An underlying network is a portion of a network made up of physical nodes and links which are reachable using a common protocol and/or a common transmission medium. For example, many links in SNA or TCP/IP networks are actually comprised of underlying networks which use protocols such as Ethernet, Frame Relay, or Asynchronous Transfer Mode ("ATM"). An underlying network provides services that are used to create logical links at the network layer.

The APPN architecture uses "Topology Routing Services" to share route and topology information. By definition, a topology subnetwork shares routing and topology information among its own network nodes, but this information is not shared with nodes outside the topology subnetwork. Therefore, while a border node in one topology subnetwork may be aware of a link address to a border node in an adjacent topology subnetwork, it has no other information about the topology of that adjacent topology subnetwork.

The underlying networks, while constructed from nodes and links like the networks, may have very different capabilities. Underlying networks may use different location protocols and different routing protocols, and may transmit data in different data packet formats. The functionality provided for nodes at the underlying network layer (sometimes referred to as the "data link" layer or "data link control" layer) is often unaware of the higher layer protocols, and in particular of the network layer protocols. Similarly, the network layer functionality may have minimal knowledge of the underlying network.

Routing protocols can take advantage of knowledge that two nodes are connected via an underlying network, and can use this knowledge to set up a logical link or path between these two nodes through the underlying network without requiring the path to be routed through any network nodes. An example scenario is illustrated in FIG. 1, where end node 100, which is located on token ring LAN segment 110, may communicate with end node 150 which is located on a different token ring LAN segment 160, without requiring the data path to be routed through either of network nodes 120, 170. Initially, a route from node 100 to node 150 may be calculated as passing through network node 120, and then to bridge 140, and from there to network node 170 after which the path ends with node 150. However, if the LAN segments 110 and 160 have been defined as being connected to the same "virtual routing node" or "VRN", then the route may be compressed such that node 100 directly addresses node 150. A VRN is an abstract representation of the underlying network which may be used for route calculation purposes. Using the compressed route, the data packets sent by node 100 use node 150 as the destination address. When the packets reach bridge 140, the bridge detects that the packets need to be transferred to LAN segment 160. Node 150 then sees that it is the destination of the packets, and removes them from the ring. A technique which may be used to implement this avoidance of the network nodes for the data transmission path was disclosed in commonly-assigned U.S. Pat. No. 5,943,317, which is entitled "Sub-network Route Optimization Over a Shared Access Transport Facility" (hereinafter "the route optimization patent"), which is hereby incorporated herein by reference as if set forth fully.

The route optimization patent applies to underlying networks wherein a common connection network, referred to therein as a "shared access transport facility" or "SATF", exists. An SATF is a communications medium that can be shared among users simultaneously. Examples include a token ring LAN and an Ethernet LAN, where use of collision detection and/or collision avoidance protocols allows the nodes on the LAN to share the medium for transmitting and receiving packets. Other examples of SATFs include X.25 networks, Frame Relay networks, and ATM networks where underlying network switches provide the arbitration necessary to permit simultaneous use.

In APPN networks, nodes which identify their connectivity to the SATF by a common virtual routing node communicate efficiently between one another even though they do not have individually defined connections to one another. (For example, with reference to FIG. 1, node 100 does not have a defined connection to node 150, yet it can communicate directly with node 150 using the techniques disclosed in the route optimization patent.) "Dual network" nodes— that is, nodes (which may be end nodes, network nodes, or border nodes) that participate in both the network and underlying network—are used for transmission and routing in the combined network, but the distributed routing protocols at the network and underlying network layer are effectively isolated from each other with this approach.

As stated earlier, networks of nodes and links may be interconnected through border nodes. The Border Gateway Protocol, or "BGP", defined in RFC 1771, "A Border Gateway Protocol 4 (BGP-4)", (March 1995), is a routing protocol that enables network-to-network communication by exchanging information through gateway nodes which are located at the border of each network. An "extended border node" or "EBN" is a border node implemented according to "APPN Extended Border Node Architecture Reference", IBM Publication SV40-0128-00. Hereinafter, the terms "border node" and "extended border node" are used interchangeably.

Border nodes allow location protocols to pass through to other topology subnets, in order to search for a particular destination node. (A "topology subnet", as the term is used herein, refers to a group of APPN network nodes that share a common topology database and participate with each other in the APPN topology and routing services protocols.) The EBNs then obtain information to be used in calculating a route to that node, and propagate this information backwards along the location protocol's path until reaching the network node from which the locate request message of the location protocol originated. FIG. 2 illustrates an example scenario where end node 200 in a first APPN network 210 requests a connection to end node 260 in a second APPN network 270. End node 260 reports information on its own address and its TG 255 to network node 250. Border node 240 obtains information on how to reach network node 250 (e.g. by consulting a topology database for network 270), and concatenates that information to the TG 255 and addressing information for end node 260. The border node then sends the information it obtained backwards along the path of the locate request message, as a locate response message. In this prior art process, one of the two EBNs at each network boundary is required to provide the other EBN a list of the links between them so that the other EBN knows which links to use to compute the data transmission path. In the example of FIG. 2, to cross between network 210 and network 270, EBN 240 is required to pass information regarding TG 235 to EBN 230.

Once the location protocol information is returned to network node 220, the network node then obtains end node 200's address and connectivity information regarding TG 205, and concatenates this to the path information returned in the locate response message. This concatenated path may be represented abstractly as:

EN 200–TG 205–NN 220–TG 225–EBN 230–TG 235–EBN 240–TG 245–NN 250–TG 255–EN 260

Route optimization is applied to this route as it is constructed. For example, the path need not traverse NNs such as 220 and 250 if there are other links or underlying networks available. However, the path must always traverse EBN 230 and EBN 240.

FIG. 3 shows an abstract representation of this prior art route selection approach, wherein the path used by the location protocol to locate end node 260 is shown using a dashed line as the upper path 310. Note that this path 310 traverses both networks 210 and 270, as described with reference to FIG. 2. The same route selection algorithm is used in each network to select a piece of the end-to-end path, and these pieces are then connected by the border nodes. The data transmission path which may result is shown using a solid line as the lower path 320. This figure illustrates that the data transmission path 320 within each network may be optimized and need not follow the same route as the location protocol. In particular, the data transmission path 320 may take full advantage of the connectivity of end node 200 and EBN 230 to underlying network 330, and of EBN 240 and end node 260 to underlying network 340. However, the data transmission path 320 may not bypass the EBNs 230, 240 through which the location protocol traversed. This is so even if underlying networks 330 and 340 are the same underlying network, such as the public Internet or other commonly-addressable collection of nodes and links. As a result, the data transmission path 320 is not truly optimized in many cases. (Furthermore, a data transmission path computed in this manner is not sufficiently flexible to avoid outages and/or network congestion that may occur at the EBNs.)

Additional drawbacks of prior art cross-network routing occur when the data transmission path crosses several networks. An example is illustrated in FIG. 4, where a path from end node 410 to end node 490 is needed. The location protocol in this example sends a locate request message from network 420 through EBN 430, to EBN 440 and then through network 450 to EBN 460. EBN 460 forwards the locate request message to an EBN in another network, such as EBN 470 which is located at the boundary of network 480. As the results of the location protocol are assembled and sent back along the location protocol's path, for example from EBN 470 to EBN 460 and so forth, the data structures used to store the concatenated route information may become quite large. A composite route selection sub-vector ("CRSS") for the path through the border nodes is stored within the locate response message when using APPN, and contains the routing information to span more than one sub-network. The CRSS has a maximum size of 256 bytes. If the routing information in this CRSS becomes too large, then the CRSS is removed. However, removing the CRSS means that route optimizations (such as the route compression technique defined in the route optimization patent) cannot be performed, and this is therefore an undesirable situation.

Accordingly, what is needed is an improved technique for routing data across multiple topology subnets which avoids the problems of the prior art.

SUMMARY OF THE INVENTION

The present invention provides an improved technique for routing data across multiple topology subnets, and improves the connectivity between nodes in multiple topology subnets, by using a common connection network. A new type of virtual node, referred to herein as a "global" virtual routing node or "GVRN", is defined to represent connectivity to an underlying network that may extend beyond the boundaries of the topology subnets in the end-to-end path. This underlying network is also referred to herein as a "common connection network" or a "global connection network". The present invention also defines novel techniques with which the EBNs pass routing information between networks to convey connectivity to the GVRN. (It should be noted that no geographical significance should be attributed to the term "global". In particular, the common connection network is not required to have a global span.)

As stated previously, the network layer and underlying network layer are distinct and architecturally separate. However, there is a need to select a route that is optimized across the entire network, including both the network layer and the underlying network layer, even though no one layer or network node necessarily understands the totality of the network configuration. The present invention provides an efficient solution to this problem.

The present invention will now be described with reference to the following drawings, in which like reference numbers denote the same element throughout.

DESCRIPTION OF PREFERRED EMBODIMENTS

Figure 1:
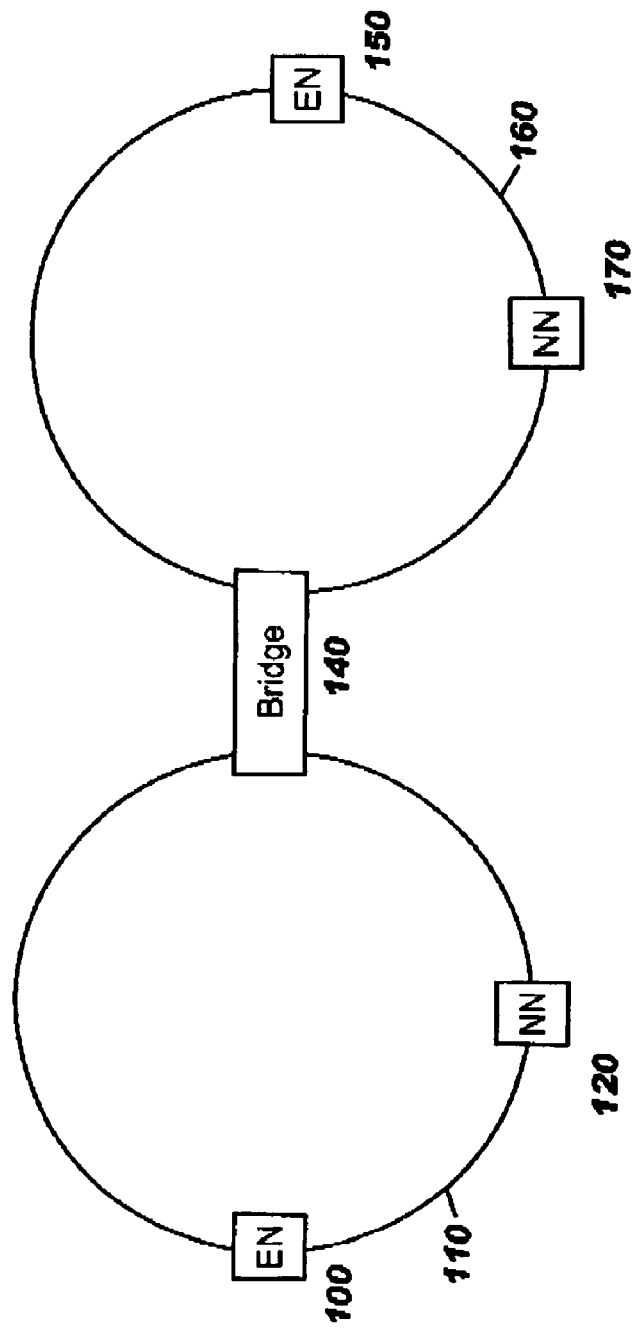
FIG. 1 is a diagram illustrating how intermediate network nodes may be avoided when routing data between nodes which are defined as being connected to the same virtual routing node, according to the prior art.
Figure 2:
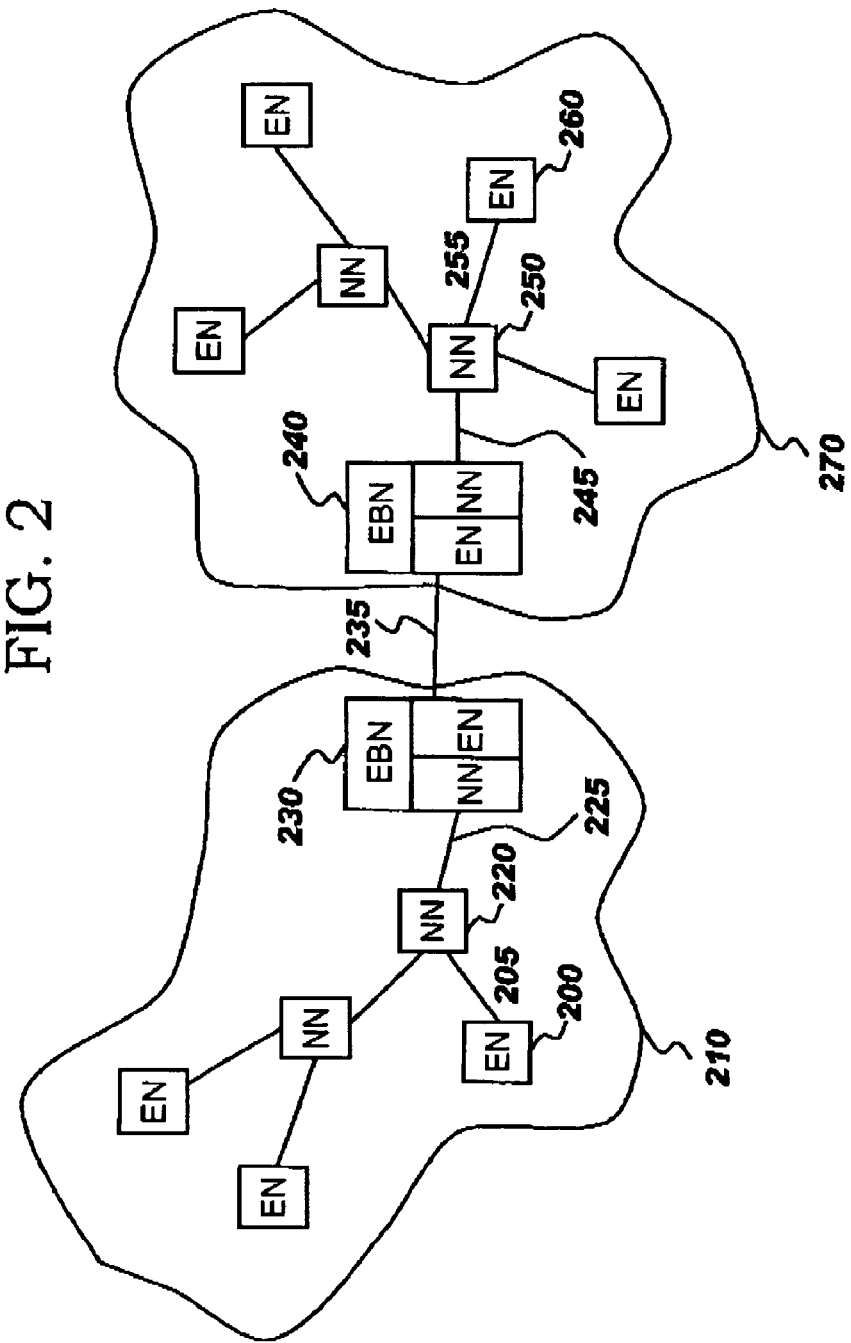
FIG. 2 provides a diagram illustrating use of border nodes to interconnect multiple networks, according to the prior art.
Figure 3:
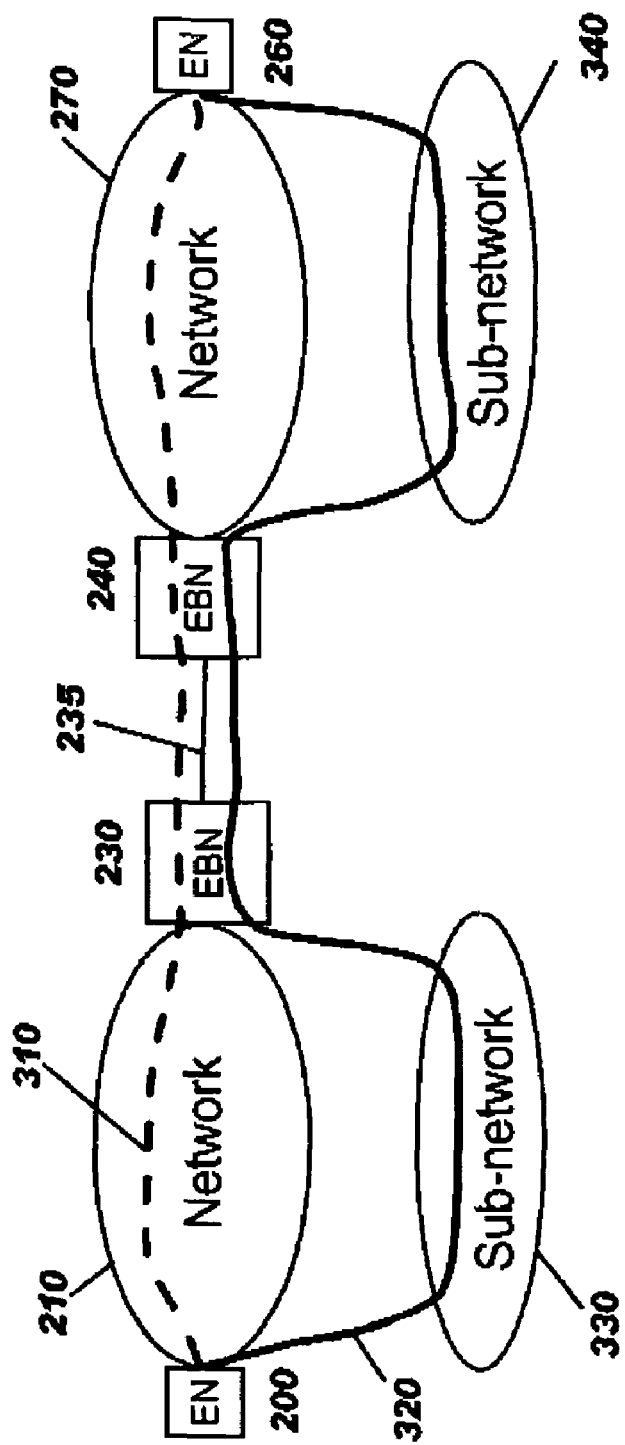
FIG. 3 provides a diagram illustrating problems existing in the prior art which, among other drawbacks, prevents data transmission paths from being fully optimized.
Figure 5:
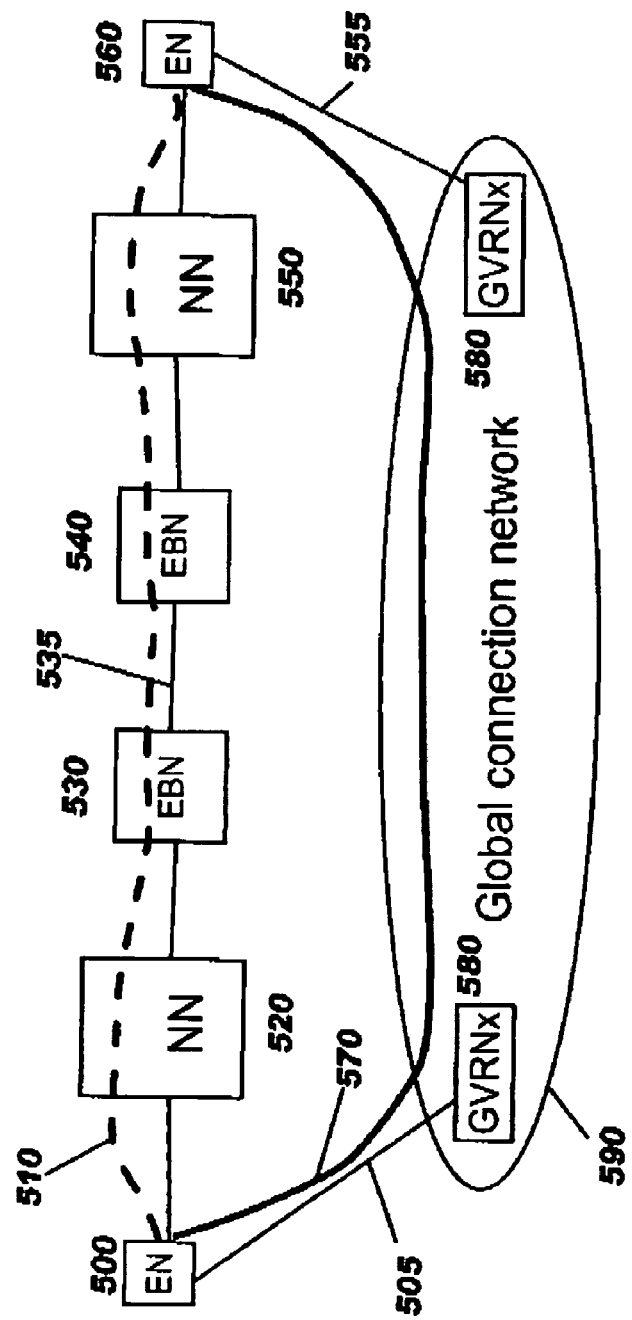
FIG. 5 provides an abstract network representation which is used to illustrate operation of preferred embodiments of the present invention.

The improved routing technique of the present invention will be described with reference to the abstract network representation in FIG. 5, and the logic depicted in FIGS. 6 and 7. In the network of FIG. 5, suppose that end node 500 wishes to transmit data to end node 560. End node 500 contacts its network node 520, which issues a locate message to determine the location of end node 560. In a similar manner to that which has been described with reference to FIG. 3, the locate message flows generally over the locate path illustrated by the dashed line 510, passing from EBN 530 across TG 535 to EBN 540, then through NN 550 and finally reaches end node 560. (Note that all interim TGs other than to EBN-to-EBN TG 535 have been omitted from FIG. 5 for ease of illustration.) However, end nodes 500 and 560 in this case each have connections defined to a GVRN according to the present invention. This GVRN is identified in FIG. 5 as "GVRNx" 580, which is conceptually located in the global connection network 590. By determining that end node 500 and end node 560 are both connected to the same GVRN, the end-to-end route may be compressed (as discussed below with reference to FIG. 7) to yield the optimized data transmission path indicated in FIG. 5 by the solid line 570.

Logic which may be used to implement preferred embodiments of the present invention, enabling the optimized data transmission path to be constructed, will now be described with reference to FIGS. 6 and 7.

Figure 4:
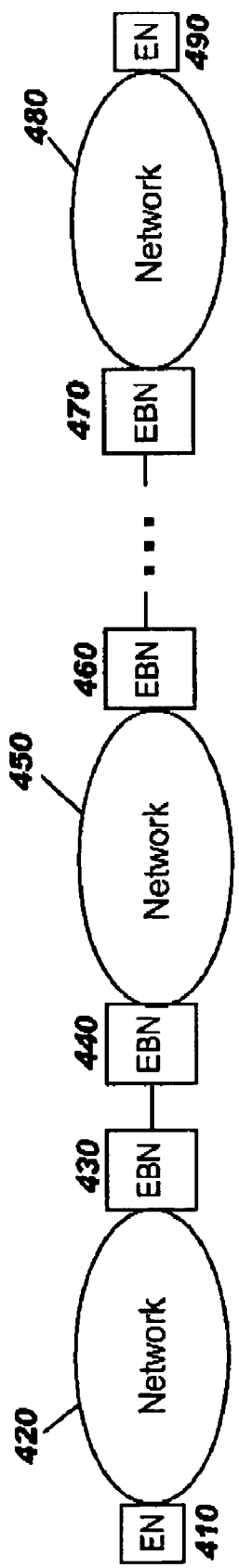
FIG. 4 illustrates a path through multiple networks, according to the prior art.
Figure 6:
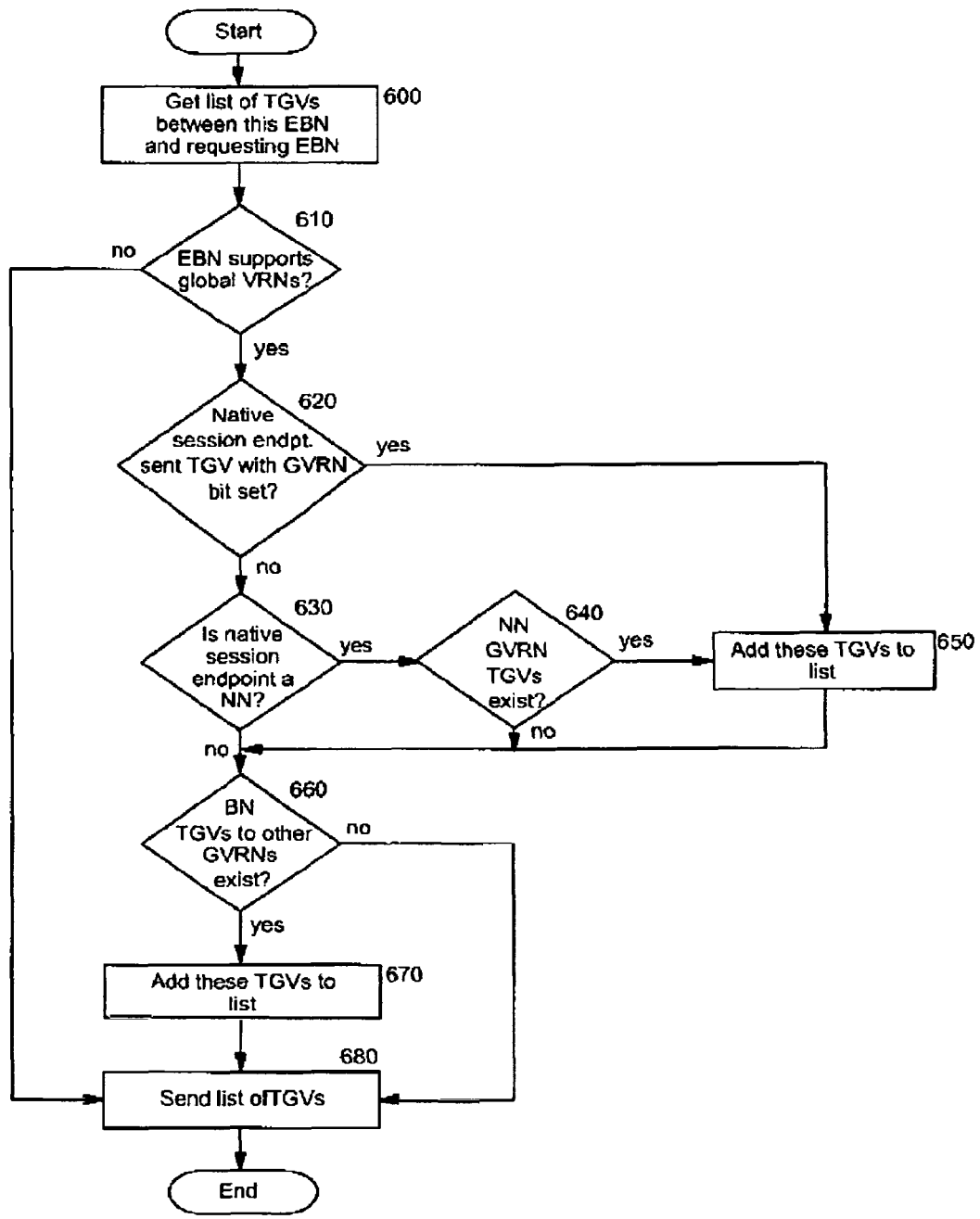
FIGS. 6 and 7 provide flowcharts depicting logic which may be used to implement preferred embodiments of the present invention.

In FIG. 6, logic is depicted which may be used to implement preferred embodiments of the present invention in EBNs within the network path, where those EBNs serve as entry border nodes (i.e. border nodes which receive a locate request, and through which the locate request enters the local network). (With reference to FIG. 5, this logic would be implemented in EBN 540, for example. In a network such as that illustrated in FIG. 4, this logic is applicable to EBNs 440 and 470.) The logic of FIG. 6 is executed as the EBN is preparing the information for a location response message which is to be forwarded back along the locate path to its previous neighboring EBN. At Block 600, a list of transmission group vectors, or "TGVs", between this EBN and its previous neighboring EBN (that is, the EBN which forwarded to locate request to the present EBN) is obtained. TGVs are known in the art, and provide information about the TGs between two nodes. The manner in which the TGVs pertaining to an EBN-to-EBN TG are determined is also known in the art.

According to the present invention, TGVs define an additional bit which is referred to herein as the "GVRN bit" to indicate whether this TGV represents a TG (i.e. a link or connection) to a GVRN. With reference to FIG. 5, the TGV representing TG 505 will have this bit set to ON, as will the TGV representing TG 555; the TGVs representing all of the other depicted TGs will have the bit set to OFF. (Nodes not implementing the present invention will, by convention, have this bit set to OFF as well, allowing for backward compatibility.)

In Block 610, a test is made to determine if this EBN supports GVRNs, as disclosed herein. If not, then control transfers to Block 680 where the list of EBN-to-EBN TGVs is forwarded as in the prior art; the processing of FIG. 6 is then complete for this EBN.

When the present EBN supports GVRNs (i.e. the test in Block 610 has a positive result), processing continues at Block 620. The test in Block 620 checks to see if the native session endpoint sent the EBN any TGVs which have the GVRN bit set to ON. If so, then Block 650 adds these TGVs to the list of EBN-to-EBN TGVs created in Block 600, after which processing continues at Block 660.

When the test in Block 620 has a negative result (i.e. the native session endpoint did not send any TGVs representing connections to GVRNs), it may happen that the native session endpoint is a network node. By definition, network nodes do not send information about their connections to EBNs, because this information is already stored in the topology database for this topology subnet. Therefore, Block 630 checks to see if the native session endpoint is a network node, and if so, the EBN searches the topology database in Block 640 to see if any TGVs which have the GVRN bit set to ON exist for this network node. Any TGVs found in this search are added to the EBN-to-EBN TGVs in Block 650.

When the test in either Block 630 or Block 640 has a negative result, control transfers to Block 660.

Ultimately, as long as the EBN supports GVRNs (i.e. the test in Block 610 has a positive result), then control will reach Block 660. In Block 660, the EBN will search for any TGVs from itself to any other GVRNs. These are TGVs from this EBN to a GVRN for which the native session endpoint does not already have a TGV to the same GVRN. If any exist (i.e. the test in Block 660 has a positive result), then Block 670 adds these TGVs to the list of EBN-to-EBN TGVs (created in Block 600) and native session endpoint TGVs which have the GVRN bit set ON (either passed by the native session endpoint or found by the EBN in Block 640).

Block 680 then sends the composite TGV list back along the location protocol path in the locate response message, and the processing of FIG. 6 ends for this EBN. Referring again to the example in FIG. 5, end node 560 has provided EBN 540 with a TGV representing the end node's connection 555 to GVRNx 580. EBN 540 sends the TGV for connection 555, along with a TGV for TG 535, to EBN 530. (The processing performed by EBN 530 upon receipt of these two TGVs is described below with reference to the logic depicted in FIG. 7.)

Figure 7:
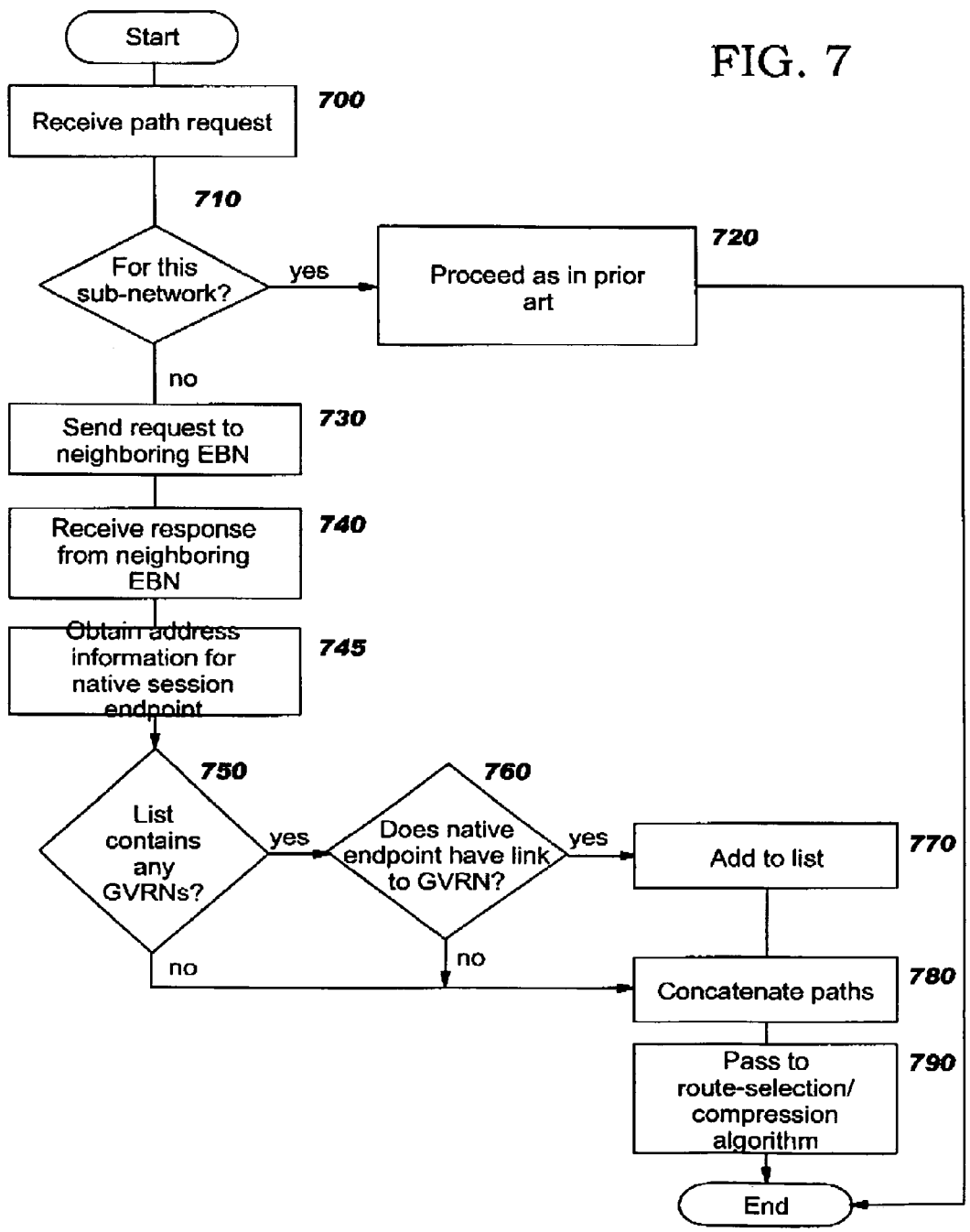

FIG. 7 illustrates logic which may be used to implement preferred embodiments of the present invention in the EBN from which the locate request message originates. (With reference to FIG. 5, this logic would be implemented in EBN 530.) The process begins at Block 700 where the path request is received from the native session endpoint (or from a network node to which that endpoint is connected). Block 710 checks to see if the destination node is located in this native network. If so, then control transfers to Block 720 where the route is computed using prior art techniques, and the processing of FIG. 7 then ends. Otherwise, processing continues at Block 730.

Block 730 forwards the locate request message to the next neighboring EBN, and Block 740 is executed when a response is received from that EBN. With reference to the example network in FIG. 5, two path segments are received at Block 740. These path segments may be represented abstractly as follows:

Path segment 1: EBN 530–TG 535–EBN 540–NN 550–EN 560

Path segment 2: GVRNx 580–TG 555–EN 560 where Path 1 segment was created in Block 600 of FIG. 6 and Path segment 2 was created in Block 650.

(As will be obvious, more than one EBN may be connected to the EBN of the originating network, in which case multiple requests may be sent in Block 730 and multiple responses may be received in Block 740. Techniques for handling multiple locate response messages when performing route selection are well known in the art, and it will be obvious that the logic in Blocks 730 through 790 may be performed for each such response message.)

After responses are received in Block 740, they are returned to the network node providing services for the native session endpoint (for example, NN 520 in FIG. 5). The remainder of FIG. 7 describes processing performed by the network node. This processing may actually take place on the same node as the EBN, but is considered functionally separate.

Block 745 obtains address information pertaining to the native session endpoint, using techniques which are known in the prior art. In particular, this information comprises a network address with which the endpoint can be reached, and information describing its connectivity to the present NN. With reference to FIG. 5, this connectivity information may be represented abstractly as follows:

EN 500–TGV 510–NN 520

Block 750 checks to see if the list of TGVs received at Block 740 contains any which have the GVRN bit set to ON. If so, then it may be possible to optimize the end-to-end path, or some portion thereof, to make use of the global connection network according to the present invention. When the test in Block 750 has a positive result, Block 760 checks to see if the native session endpoint also has one or more links to a GVRN. If so, then control transfers to Block 770 where a TGV for each such link is added to a list. When the tests in Block 750 and Block 760 have negative results, control passes directly to Block 780.

With reference to FIG. 5, a TGV representing link 505 is created for the native session endpoint 500 by the processing of Block 770. This connectivity information may be represented abstractly as follows:

EN 500–TGV 505–GVRNx 580

Block 780 concatenates the connectivity information for the native network to the path information received in Block 740 from the locate response message. In the example scenario shown in FIG. 5, each of the two path segments created by NN 520 (in Blocks 745 and 770, respectively) may be joined with its common node from a corresponding path segment sent by EBN 540, yielding two end-to-end paths which may be represented abstractly as follows:

Path 1: EN 500–NN 520–EBN 530–TG 535–EBN 540–NN 550–EN 560

Path 2: EN 500–TGV 505–GVRNx 580–TG 555–EN 560

As indicated in Block 790, these concatenated paths may be passed to a route selection or compression algorithm for further analysis. The process of FIG. 7 then ends.

Typically, the route having the fewest nodes and links will be selected, as stated earlier. Note that in the example scenario, Path 1 has 6 nodes and 5 links (see route 510 of FIG. 5), although not all of the links are specified in the abstract notation, and Path 2 has 3 nodes and 2 links (see route 570 of FIG. 5). Therefore, Path 2 will be selected when optimizing for the shortest path.

As has been demonstrated, the GVRN of the present invention enables use of an improved, efficient technique as disclosed herein for routing data through networks which are connected to a common underlying network or connection network which extends beyond the individual topology subnets. This technique adheres to the topology isolation requirement of each network, yet enables the data transmission path to bypass EBNs through which the location protocol traveled, providing optimized data transmission paths which may in many cases be shorter than the data transmission paths which are available using prior art techniques. Note also that because the connections to the global or common underlying network are represented using a single TGV, there is no need to maintain a CRSS for this path; a CRSS is only needed for the path though the border nodes. Although the path through the border nodes may grow so large that it exceeds the 256-byte maximum size of the CRSS (which will cause the CRSS to be dropped and result in a loss of session path awareness at the endpoints), this problem does not occur for the path through the global connection network, thereby avoiding yet another drawback of the prior art.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowcharts and/or block diagrams of methods, apparatus (systems) and computer program products according to embodiments of the invention. It will be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart flow or flows and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. A method of improving connectivity among topology subnets using a common connection network, comprising:

determining, by a border node located at a border of a particular one of the topology subnets, one or more links between the border node and a neighboring border node located at the border of a different one of the topology subnets, wherein a first session endpoint resides in the particular one of the topology subnets and has connectivity to a global virtual routing node ("GVRN");

creating a list of the determined links;

determining that the first session endpoint has connectivity to the GVRN and adding link information to the created list to represent the determined connectivity of the first session endpoint to the GVRN;

forwarding the list to the neighboring border node;

receiving, at the neighboring border node, the list;

determining whether a second session endpoint, which resides in the different one of the topology subnets, has connectivity to the GVRN or to another GVRN, and, when the second session endpoint has connectivity to the GVRN or to another GVRN, adding link information to the list to represent the determined connectivity; and using the list to select a data transmission path between the first session endpoint and the second session endpoint.

2. The method according to claim 1, wherein using the list to select a data transmission path further comprises checking to see if both the first session endpoint and the second session endpoint have connectivity to a common GVRN, and, when both the first session endpoint and the second session endpoint have connectivity to a single GVRN, determining whether selecting the common GVRN as a node in the data transmission path results in an optimal data transmission path.

3. A system for improving connectivity among topology subnets using a common connection network, comprising:

means for determining, by a border node located at a border of a particular one of the topology subnets, one or more links between the border node and a neighboring border node located at the border of a different one of the topology subnets, wherein a first session endpoint resides in the particular one of the topology subnets and has connectivity to a global virtual routing node ("GVRN");

means for creating a list of the determined links;

means for determining that the first session endpoint has connectivity to the GVRN and adding link information to the list to represent the determined connectivity of the first session endpoint to the GVRN;

means for forwarding the list to the neighboring border node;

means for receiving, at the neighboring border node, the list;

means for determining whether a second session endpoint, which resides in the different one of the topology subnets, has connectivity to the GVRN or to another GVRN, and, when the second session endpoint has connectivity to the GVRN or to another GVRN, adding link information to the list to represent the determined connectivity; and means for using the list to select a data transmission path between the first session endpoint and the second session endpoint.

4. The system according to claim 3, wherein the means for using the list to select a data transmission path further comprises means for checking to see if both the first session endpoint and the second session endpoint have connectivity to a common GVRN, and, when both the first session endpoint and the second session endpoint have connectivity to a single GVRN, determining whether selecting the common GVRN as a node in the data transmission path results in an optimal data transmission path.

5. A computer program product for improving connectivity among topology subnets using a common connection network, the computer program product embodied on one or more computer readable media and comprising:

computer readable program code that is configured to determine, by a border node located at a border of a particular one of the topology subnets, one or more links between the border node and a neighboring border node located at the border of a different one of the topology subnets, wherein a first session endpoint resides in the particular one of the topology subnets and has connectivity to a global virtual routing node ("GVRN");

computer readable program code that is configured to create a list of the determined links;

computer readable program code that is configured to determine that the first session endpoint has connectivity to the GVRN and to add link information to the list to represent the determined connectivity of the first session endpoint to the GVRN;

computer readable program code that is configured to forward the list to the neighboring border node;

computer readable program code that is configured to receive, at the neighboring border node, the list;

computer readable program code that is configured to determine whether a second session endpoint, which resides in the different one of the topology subnets, has connectivity to the GVRN or to another GVRN, and, when the second session endpoint has connectivity to the GVRN or to another GVRN, to add link information to the list to represent the determined connectivity; and computer readable program code that is configured to use the list to select a data transmission path between the first session endpoint and the second session endpoint.

6. The computer program product according to claim 5, wherein the computer readable program code that is configured to use the list to select a data transmission path further comprises computer readable program code that is configured to check to see if both the first session endpoint and the second session endpoint have connectivity to a common GVRN, and, when both the first session endpoint and the second session endpoint have connectivity to a single GVRN, that is configured to determine whether selecting the common GVRN as a node in the data transmission path results in an optimal data transmission path.

* * * * *